US010430922B2

(12) United States Patent
Savvides et al.

(10) Patent No.: US 10,430,922 B2
(45) Date of Patent: Oct. 1, 2019

(54) METHODS AND SOFTWARE FOR GENERATING A DERIVED 3D OBJECT MODEL FROM A SINGLE 2D IMAGE

(71) Applicant: Carnegie Mellon University, Pittsburgh, PA (US)

(72) Inventors: Marios Savvides, Pittsburgh, PA (US); Chandrasekhar Bhagavatua, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/698,829

(22) Filed: Sep. 8, 2017

(65) Prior Publication Data

US 2018/0068414 A1 Mar. 8, 2018

Related U.S. Application Data

(60) Provisional application No. 62/495,271, filed on Sep. 8, 2016.

(51) Int. Cl.
*G06T 3/00* (2006.01)
*G06T 7/73* (2017.01)
*G06T 17/20* (2006.01)
*G06T 7/536* (2017.01)

(52) U.S. Cl.
CPC ............ *G06T 3/0093* (2013.01); *G06T 7/536* (2017.01); *G06T 7/73* (2017.01); *G06T 17/20* (2013.01); *G06T 2200/04* (2013.01); *G06T 2200/08* (2013.01); *G06T 2207/30201* (2013.01); *G06T 2207/30204* (2013.01); *G06T 2207/30244* (2013.01)

(58) Field of Classification Search
CPC ..... G06T 3/0093; G06T 7/73; G06T 2200/04; G06T 2200/08; G06T 2207/30201; G06T 2207/30204; G06T 2207/30244
USPC ......................................................... 382/154
See application file for complete search history.

(56) References Cited

U.S. PATENT DOCUMENTS

| 2005/0031195 | A1* | 2/2005 | Liu | G06K 9/00275 |
| | | | | 382/154 |
| 2014/0043329 | A1* | 2/2014 | Wang | G06T 17/20 |
| | | | | 345/420 |
| 2016/0042515 | A1* | 2/2016 | Sorgi | G06T 7/35 |
| | | | | 382/154 |

\* cited by examiner

*Primary Examiner* — Amandeep Saini
(74) *Attorney, Agent, or Firm* — Downs Rachlin Martin PLLC (57) ABSTRACT

Methods of reconstructing a 3D object model from portions of an object in a single 2D image using an existing 3D object model that is generic to a class to which the object in the 2D image belongs. In some embodiments, the methods determine a camera center from a computed estimated camera projection matrix. Landmark points on the object in the 2D image are back-projected to the existing 3D object model to warp the existing 3D object model according to the landmark points in the 2D image to create a derived 3D object model of the 2D object in the 2D image. Optional additional processing steps can include regularization, texturing, and infill of missing regions of the derived 3D object model. An example implementation of the disclosed methods is 3D craniofacial reconstruction from a single 2D image containing at least a portion of a face.

20 Claims, 9 Drawing Sheets

METHODS AND SOFTWARE FOR GENERATING A DERIVED 3D OBJECT MODEL FROM A SINGLE 2D IMAGE

RELATED APPLICATION DATA

This application claims the benefit of priority of U.S. Provisional Patent Application Ser. No. 62/495,271, filed Sep. 8, 2016, and titled "Cranio Facial Reconstruction From A Single Image," which is incorporated by reference herein in its entirety.

FIELD OF THE INVENTION

The present invention generally relates to the field of computer reconstruction. In particular, the present invention is directed to methods and software for generating a derived three-dimensional (3D) object model from a single 2D image.

BACKGROUND

In many applications of machine learning and pattern recognition, it is often easy to design an algorithm to perform a particular task given aligned input data. For example, if one is trying to perform character recognition and the characters always appear in exactly the same fashion, it is quite simple for any method to correctly determine which character is being seen. However, the input data often has undergone some sort of transformation before being seen by the system, for instance, if the characters are written by two different people or if the surface on which they are written is viewed from a different angle. These variances, or transformations, cause degradations in the performance of systems that rely on aligned data to perform their task. Similarly, when dealing with faces in tasks such as face detection, facial landmarking, or face recognition, the face can have wildly differing appearances based on the viewpoint of the camera. When dealing with simple distortions, such as a projective transformation, it is a fairly simple process to normalize the image. However, a projective transformation normalizes planar surfaces but not any 3D object in the scene.

Reconstructing the 3D structure of any general object cannot be done from a single two-dimensional (2D) image due to ambiguities in the projective geometry of the camera. However, under certain assumptions, this ambiguity can be resolved. In the case of 3D craniofacial reconstruction, the interest is only in reconstructing the 3D structure of a person's head, which drastically reduces the possible 3D objects that could be seen when looking at the 2D image. Some methods have already shown how a 3D reconstruction of the face can be generated from a single 2D image. The 3D Generic Elastic Models (3D-GEM) technique by Heo and Savvides (J. Heo and M. Savvides, 3-d generic elastic models for fast and texture preserving 2d novel pose syntheses, IEEE *Transactions on Information Forensics and Security,* 7(2):563-576, April 2012) was shown to be able to generate very accurate 3D reconstructions of the face from a single, frontal 2D image. These renderings were even used to improve face recognition results later by Prabhu et al. (U. Prabhu, J. Heo, and M. Savvides, Unconstrained pose-invariant face recognition using 3d generic elastic models, IEEE *Transactions on Pattern Analysis and Machine Intelligence,* 22(10):1952-1961, October 2011) showing how using the 3D information of the face can be very useful in other tasks, such as face recognition. This has been built upon by many others in recent works.

SUMMARY OF THE DISCLOSURE

In one implementation, the present disclosure is directed to a method of generating a derived 3D object model of an object from an input 2D image containing at least a portion of the object. The method includes receiving the input image and storing the input image in computer memory; receiving a plurality of 2D landmark points on the object within the input 2D image; executing an estimation algorithm to compute an estimated camera projection matrix for the input 2D image, wherein the estimation algorithm uses an existing 3D object model and is configured to minimize an average reprojection error; generating a set of derived 3D landmark points by executing a camera center algorithm that computes a camera center from the estimated camera projection matrix; executing a 3D landmark algorithm that computes, for each of the plurality of 2D landmark points, a corresponding derived 3D landmark point; warping the existing 3D object model using at least the derived 3D landmark points to generate the derived 3D object model; and storing the derived 3D object model in the computer memory.

In another implementation, the present disclosure is directed to a computer-readable storage medium containing computer-executable instructions that, when executed on a computing system, performs a method of generating a derived 3D object model of an object from an input 2D image containing at least a portion of the object. The method includes receiving the input image and storing the input image in computer memory; receiving a plurality of 2D landmark points on the object within the input 2D image; executing an estimation algorithm to compute an estimated camera projection matrix for the input 2D image, wherein the estimation algorithm uses an existing 3D object model and is configured to minimize an average reprojection error; generating a set of derived 3D landmark points by executing a camera center algorithm that computes a camera center from the estimated camera projection matrix; executing a 3D landmark algorithm that computes, for each of the plurality of 2D landmark points, a corresponding derived 3D landmark point; warping the existing 3D object model using at least the derived 3D landmark points to generate the derived 3D object model; and storing the derived 3D object model in the computer memory.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

I. General Introduction

In some aspects, the present invention is directed to methods of generating a 3D model of an object using a single 2D image of the object as the basis for constructing the 3D object model. Since the 3D model is derived from the 2D image, the model is referred to herein and in the appended claims as a "derived 3D object model." The process of generating such a derived 3D object model is referred to herein as "reconstruction," as the derived 3D object model is essentially reconstructed from the object as depicted in 2D in the input 2D image. As those skilled in the art will readily appreciate, methods of the present disclosure can be used for any of many types of objects having a generic 3D form that can be augmented with landscape points that can be used to relate the generic model of an object to a specific instance of the object depicted in the 2D image. Examples of objects for which derived 3D models can be reconstructed include, but are not limited to, human faces, animal faces, specific types of vehicles, and human bodies, among many others. While those skilled in the art will readily understand how methodologies of the present disclosure are applicable to generating derived 3D object models of any of a wide variety of objects, an object of research of the present inventors is the human craniofacial structure. Consequently, the detailed example presented below in Section II is directed to a method of generating a derived 3D craniofacial model from a single 2D image of a human face. Those skilled in the art will appreciate that the general methodologies disclosed herein are not limited to 3D craniofacial structure reconstruction and will readily understand the modifications to the example 3D craniofacial reconstruction method needed to adapt the methodologies thereof to other types of objects.

Figure 1:
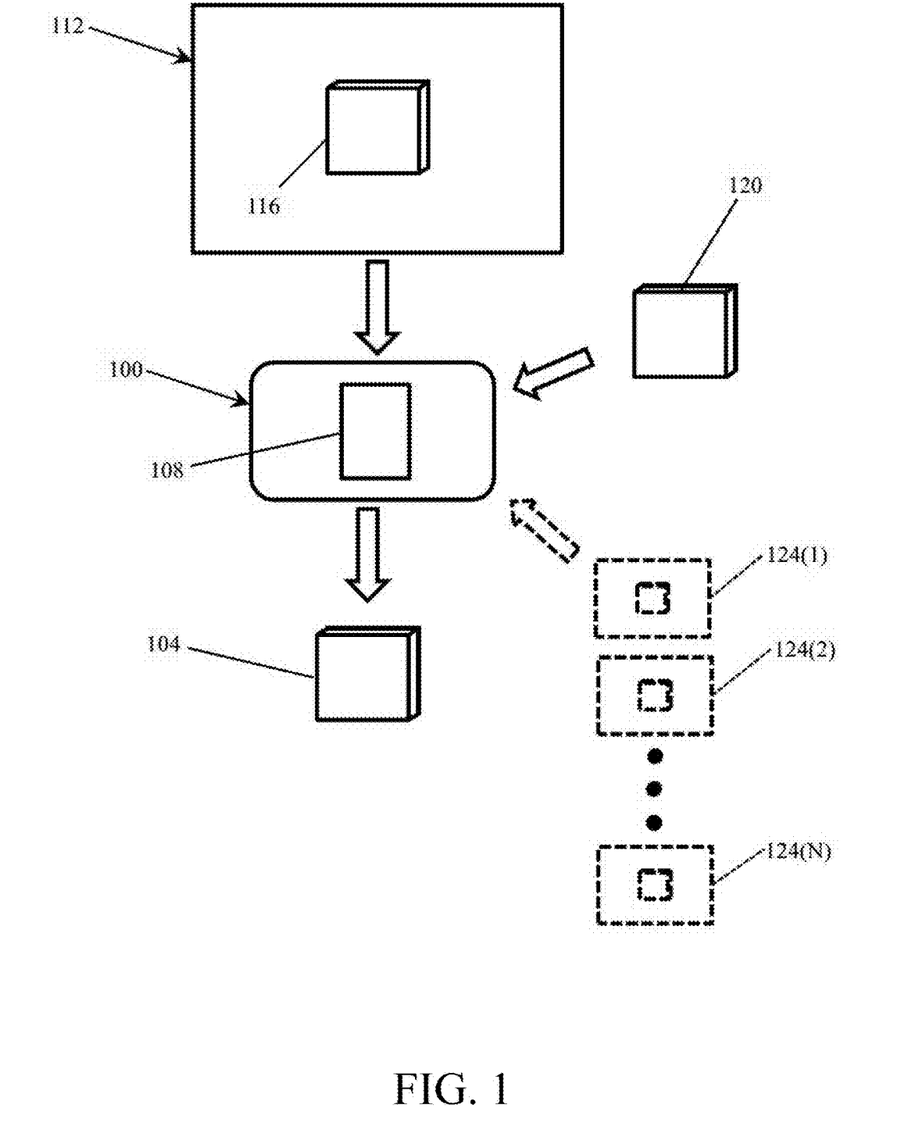
FIG. 1 is a high-level diagram of a system for generating a derived 3D object model from a single 2D image.

Referring now to the drawings, FIG. 1, illustrates an example system 100 for generating a derived 3D object model 104. As alluded to above, at a high level, 3D-model-generating system 100 is configured to execute a 3D model derivation process 108 that is designed and configured to generate derived 3D object model 104 from a single input 2D image 112 containing at least a portion of an object 116 to be modeled. As those skilled in the art will readily appreciate, input 2D image 112 may be any suitable type of digital image, such as a digital or digitized photographic image, a digital or digitized frame of a video or film, a digital scanned image, among others. It is noted that input 2D image 112 may be a portion of a larger image that has been selected for generating a derived 3D object model a priori.

Figure 14:
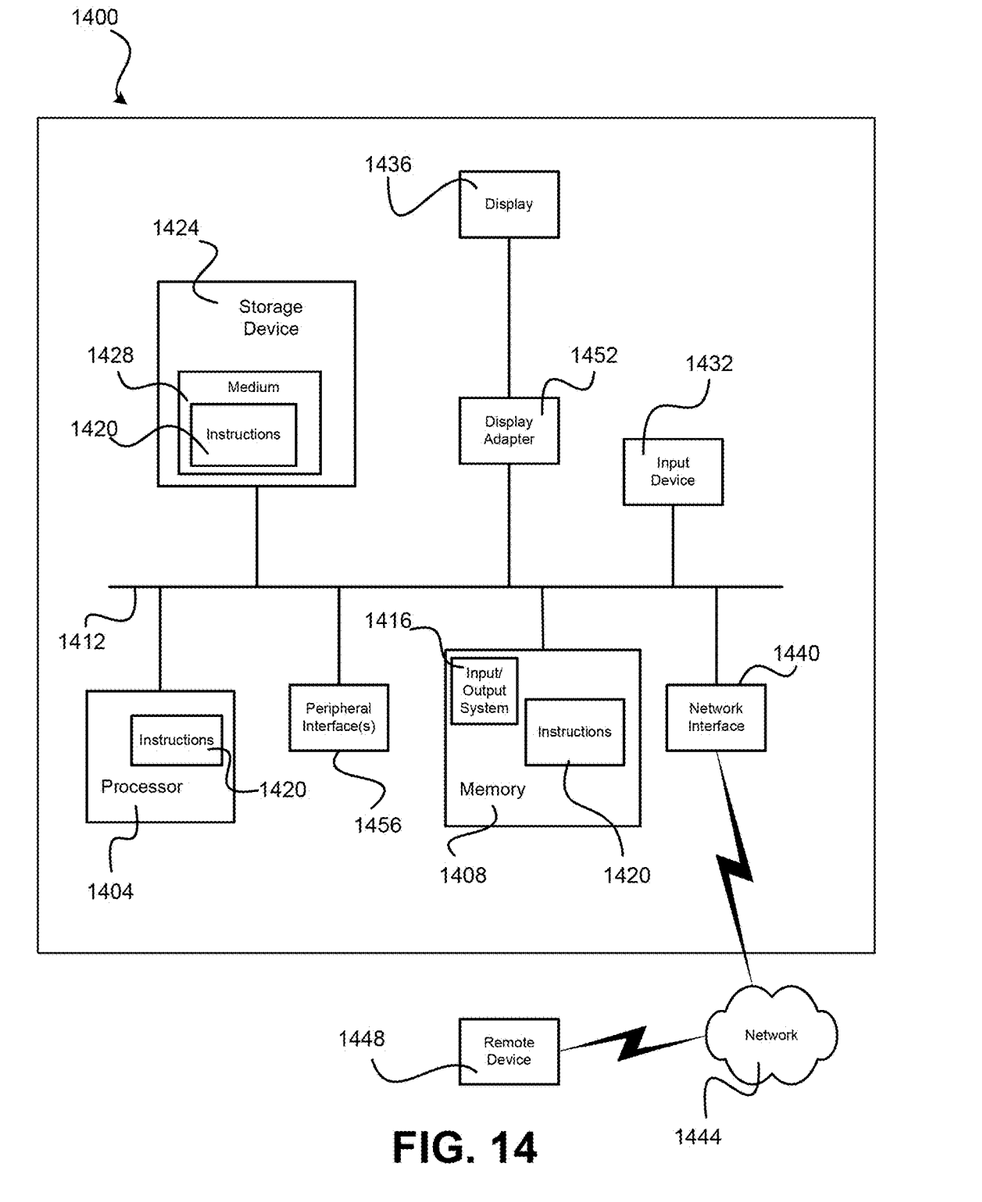
FIG. 14 is a block diagram of a computing system that can contain and/or be used to implement any one or more of the 3D object reconstruction methodologies disclosed herein.

While a computing system is not depicted in FIG. 1, those skilled in the art will readily understand that an object-detection system, such as 3D-model-generating system 100 of FIG. 1, is a combination of 1) software suitably coded to perform at least the functions described herein and any other complementary and supplementary functions needed to create a fully functional object-detection system and 2) hardware designed and configured to execute such software. Suitable hardware for executing such software is ubiquitous in this day in age, such that a description of even one set of hardware is not needed for those skilled in the art to carry out the present invention. That said, some basic examples of suitable hardware include, but are not limited to, a general purpose computing device (e.g., laptop, desktop, tablet, smartphone, server, mainframe, supercomputer), one or more networks of general purpose computing devices, an application-specific computing device or network of such devices, among many others. Such computing devices may each include one or more GPUs to aid in computations, one more central processing units, and/or one or more application-specific processing units, such as one or more application-specific integrated circuits, one or more systems on chip, and/or one or more field-programmable gate arrays, among others. Fundamentally, there are no limitations on the software and computing hardware as long as they are compatible and are able to provide the requisite functionality. For the sake of convenience, any machine memory needed for providing the requisite functionality is referred to herein as "computer memory." Computer memory includes both non-volatile and volatile memory of any known type. FIG. 14 illustrates one example of a computing system 1400 that could form all or part of the computing hardware needed to provide a fully functional object-detection system.

Figure 2:
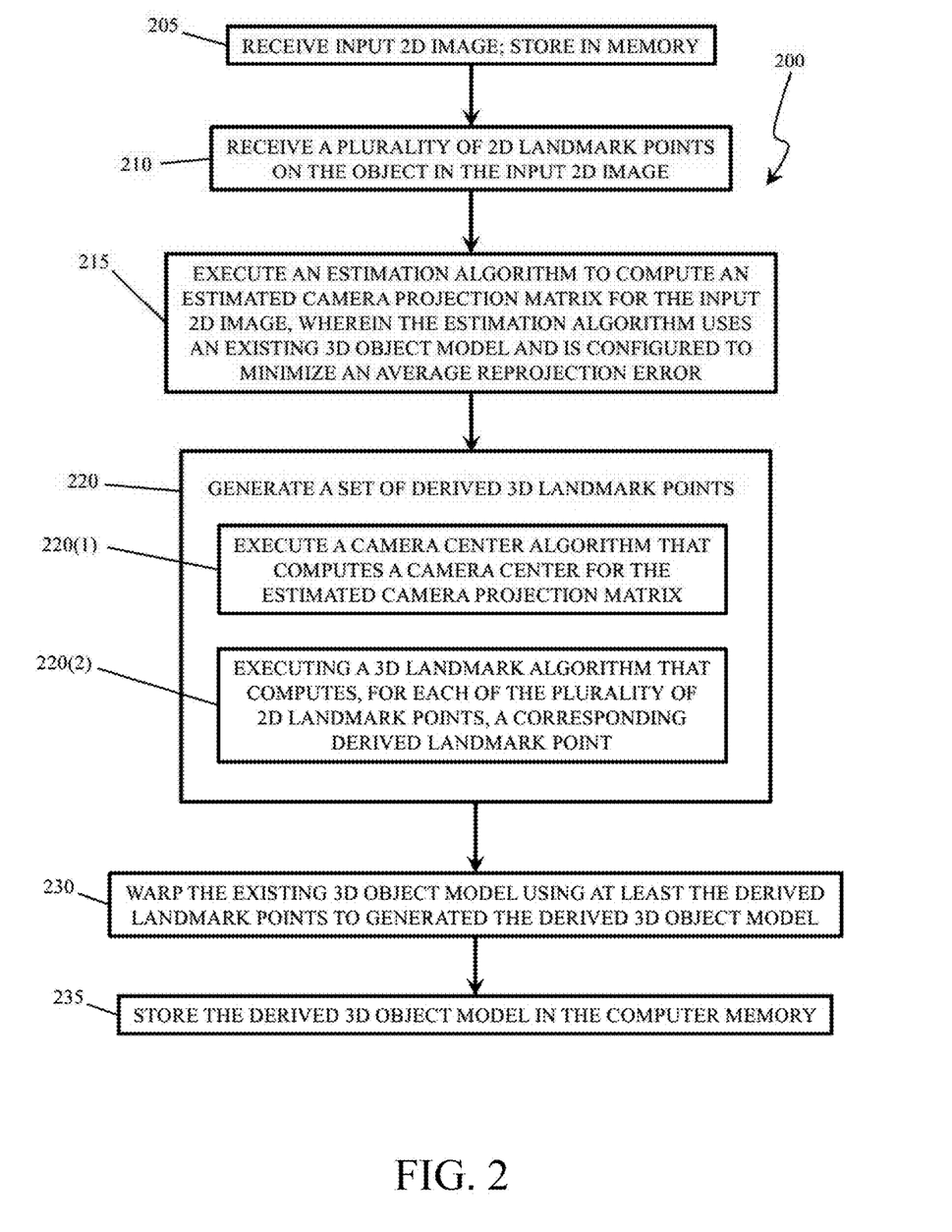
FIG. 2 is a flow diagram of an example method of generating a derived 3D object model from a single 2D image.

Referring to FIG. 2, and also occasionally to FIG. 1 for 100-series element numerals, FIG. 2 illustrates an example method 200 of generating a derived 3D object model, such as derived 3D object model 104, from a single 2D image, such as input 2D image 112, that contains at least a portion of the object to be modeled, such as the portion of object 116. As discussed above, object 116 can be any of a wide variety of objects, such as, a human face, animal face, animal body, specific type of vehicle, and human bodies, among many others. At step 205, a 3D-model-generating system, such as 3D-model-generating system 100, receives input 2D image and stores it in a computer memory. At step 210, 3D-model-generating system 100, receives a plurality of 2D landmark points on object 116 in input 2D image 112.

As described below in connection with a detailed example, 3D-model-generating system 100 may receive the 2D landmark points in any suitable manner, such as from an automated landmarking application or via human input. Section II.A, below, provides additional information about landmarking that can be performed in conjunction with step 210.

At step 215, 3D-model-generating system 100 executes an estimation algorithm to compute an estimated camera projection matrix for the input 2D image. In an example, the estimation algorithm uses an existing 3D object model 120, such as a generic 3D object model that is generic to the particular class of object that is the subject of reconstruction. A detailed example of a suitable estimation algorithm that can be performed at step 215 is described below in Section II.B. As discussed in Section II.B, below, the estimation algorithm may be configured to minimize average reprojection errors.

At step 220, 3D-model-generating system 100 generates a set of derived 3D landmark points, for example, by performing substeps 220(1) and 220(2). At substep 220(1), the 3D-model-generating system 100 executes a camera center algorithm that computes a camera center for the estimated camera projection matrix of step 215. Steps of an example camera center algorithm that can be implemented at substep 220(1) are described below in detail in Section II.C. At substep 220(2), 3D-model-generating system 100 executes a 3D landmark algorithm that computes, for each of the plurality of 2D landmark points in the input 2D image, a corresponding derived landmark point. In one example, the 3D landmark algorithm computes each of the derived 3D landmark points by finding a 3D point along a ray extending from the camera center through a corresponding one of the plurality of 2D landmark points that minimizes error between the 3D point and a corresponding 3D landmark point on existing 3D object model 120. Further details of using such a back-projection technique are described below in Section II.C.

At step 230, the 3D-model-generating system 100 warps existing 3D object model 120 using at least the derived landmark points to generate derived 3D object model 104. Details concerning warping that can be performed at step 230 are described below in Section II.C. At step 235, 3D-model-generating system 100 may store derived 3D object 104 model in the computer memory.

At the end of step 230, derived 3D object model 104 is good; however, it can optionally be further refined by performing one or more additional steps. For example, after step 230, derived 3D object model 104 can be regularized to complete the derived 3D object model where data from input 2D image 112 was missing. Such regularization can be accomplished using any suitable data completion technique, such as either of the Weighted General Hebbian Analysis (WGHA) and Weighted K-SVD (WK-SVD) techniques, among others. The data completion technique implemented utilized a plurality of scanned and annotated 3D images 124(1) to 124(N) as ground truth data for learning a basis for completing the data. Examples of regularization techniques that can occur after step 230 is described below in Section II.D.

Following step 230, derived 3D object model 104 can optionally be textured based on texture information present in input 2D image 112. In addition, any missing regions can be filled in using a data completion framework. Details regarding examples of texturing and filling of missing regions are found, respectively, in Sections II.E. and II.F. below.

II. Example: 3D Craniofacial Reconstruction Method

This section illustrates a specific example of method 100 adapted for generating a full 3D craniofacial model reconstructed from a single input image of a face. At a high level, the method first landmarks the input image and uses the landmarks to compute a camera projection matrix estimate for the particular input image. The camera projection matrix is then used to back project rays into 3D space so that a generic 3D model can be warped to fit the image in the input image so as to generate a derived 3D craniofacial model for the face in the input image. In this manner, the present method avoids the use of a generic 3D shape for everyone. After warping, the new derived craniofacial shape may be regularized using data from many 3D scans. The regularized shape is then used to extract texture from the input image to maintain as much information of the craniofacial structure as possible. Self-occluded regions are then filled in using a suitable data-completion technique, which leads to a fully textured person-specific derived 3D craniofacial model that can be rendered from any viewpoint for use with any of a variety of applications, such as, face recognition, soft biometrics (i.e., gender and ethnicity recognition), facial reenactment (playing one person's actions over another in video), synthetic data generation for many other machine learning tasks, and digital avatar creation, among others. Each of the various steps of an example 3D craniofacial reconstruction method are detailed in the following subsections.

II. A. Landmarking the Input Image

As with other 3D reconstruction methods, some set of landmarks on the face is needed in order to generate the model. Due to the nature of the camera projection estimation in Section II.B. and the shape warping in Section II.C., the only restriction on landmark points is that there are at least six points and that at least four of these points are non-colinear. The landmark points can be given by human input, which can often be more accurate than automatic landmarking methods. Generally, human inputted landmarking points typically result in a more accurate 3D model as long as the person providing the landmarks properly follows whichever scheme is being used internally. However, for processing large numbers of faces, it is often infeasible to acquire hand-selected landmarks on every face. In those scenarios, any suitable automatic landmarking method can be used to generate landmarks on the images that will be processed.

Figure 3A:
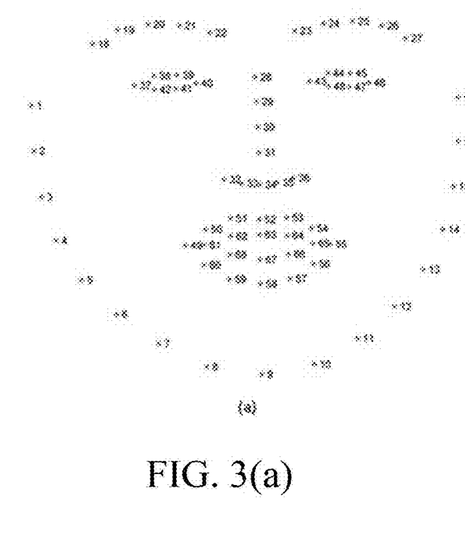
FIG. 3(a) is a diagram of a 68-point landmarking scheme.
Figure 3B:
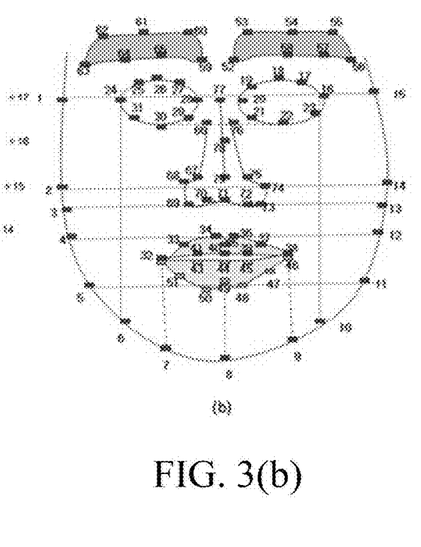
FIG. 3(b) is a diagram of a 79-point landmarking scheme suitable for use in embodiment of methods of the present disclosure directed to 3D craniofacial reconstruction.

Many landmarking methods exist, and there are many tradeoffs between them. For example, one group developed a very fast method, capable of landmarking faces in one millisecond. This method has been implemented in the known open source library, dlib. While this method is very fast, it does not provide as accurate landmarks as one might desire, especially from off angle faces. Another method that has been used is a method that is tolerant to pose, expression, and occlusions in the alignment of the face. This method gives much more accurate landmarks but is much slower than the previously mentioned method. Both of these methods can be trained on any landmarking scheme provided there is enough training data. However, the models provided with the dlib landmarker only match the 68 point scheme currently popular in academia today. The latter landmarker provides a model that follows a 79 point scheme. Both schemes are illustrated in FIGS. 3(*a*) and (*b*). Embodiments of methods disclosed herein can be used with either of these schemes or with any scheme that meets the restrictions laid out at the beginning of Section II.A.

Figure 4A:
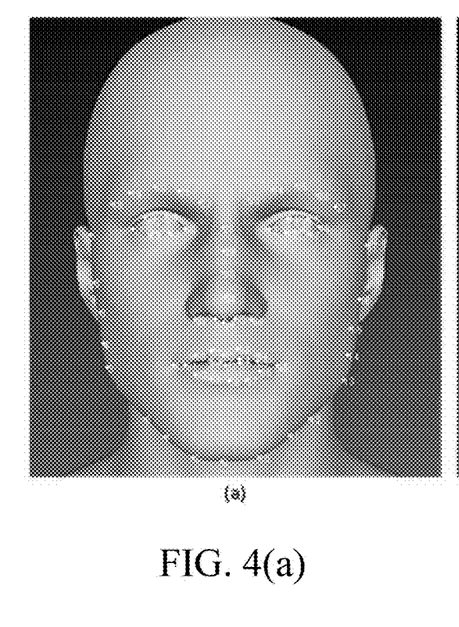
FIG. 4(a) is a diagram of the 68-point landmarking scheme of FIG. 3(a) applied to a generic 3D facial model.
Figure 4B:
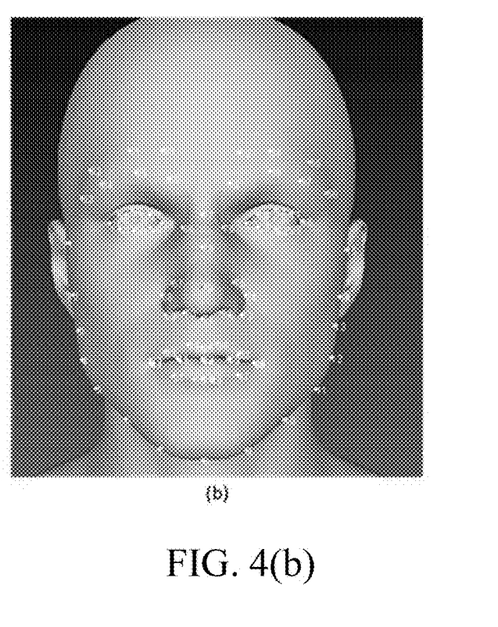
FIG. 4(b) is a diagram of the 79-point landmarking scheme of FIG. 3(b) applied to the same generic facial model.

In order to use any scheme, the corresponding 3D landmarks on a suitable 3D model also need to be known. In one example, the 3D model is a generic 3D craniofacial model, warped accordingly to generate a new 3D shape. Since this embodiment uses just the one 3D model, the landmarks only need to be specified on this model. As noted above, these landmark points can be specified by hand because the accuracy of these landmark points is very important to the overall accuracy of the method, and an automated 3D landmarker would not necessarily work very well on a model with no texture. FIGS. 4(a) and (b) illustrate as examples a generic 3D model with both the hand-clicked 68 and 79 point schemes overlaid on the model.

II. B. Estimating the Camera Projection Matrix

Once the landmarks have been found on the 2D image, a camera projection matrix, M, is computed that relates the 3D landmarks and the 2D landmarks. Camera geometry relates how a point in 3D space will project onto an image plane that the camera is capturing, thus informing of how any point in 3D space will appear in the image being viewed. In order to estimate a camera projection matrix, a set of correspondences between the 3D object and the image representation is needed. Since M is camera specific, the estimate of M is often done by using a known calibration pattern and taking many images of it from many angles. However, in one scenario, none of the properties about the camera are known and access to the camera is not available to determine the camera matrix. In the present scenario, though, it is known that the subject is a human head, and, therefore, the generic 3D head model noted above can be used to get a close estimate of M.

M relates a 3D homogenous point $p_w$ to a 2D homogenous point $p_c$ by the following equation:

$$Mp_w \cong p_c \quad (1)$$

Wherein $\cong$ means the two sides are equal up to scale. This means that any constant, $\lambda$, could be multiplied by either side and the equality up to scale would hold. This is because of the projective nature of cameras where all sense of depth is lost when projecting to an image plane. Using this relationship and the correspondences between the 2D and 3D landmarks, a system of linear equations can be set up to find M. However, the equality up to scale has to be removed. To do this, it is seen that for any given correspondence, the following holds:

$$Mp_w \cong p_c \quad (2)$$

$$\begin{bmatrix} m_1^T p_w \\ m_2^T p_w \\ m_3^T p_w \end{bmatrix} \cong \begin{bmatrix} x_c \\ y_c \\ 1 \end{bmatrix}$$

$$\rightarrow \frac{m_1^T p_w}{m_3^T p_w} = x_c, \frac{m_2^T p_w}{m_3^T p_w} = y_c$$

$$\rightarrow m_3^T p_w x_c - m_1^T p_w = 0$$

This provides two linear equations per correspondence that can be used to find $m_1^T, m_2^T, m_3^T$, i.e., the rows of M. A matrix, D, can be created with the rows:

$$D = \begin{bmatrix} p_{w_1}^T & 0 & x_{c_1} p_{w_1}^T \\ 0 & p_{w_1}^T & y_{c_1} p_{w_1}^T \\ \vdots & \vdots & \vdots \end{bmatrix} \quad (3)$$

wherein $p_{w_i}$ is the $i^{th}$ 3D landmark and $x_{c_i}$ and $y_{c_i}$ are the x and y coordinates of the $i^{th}$ 2D landmark. Then, a system of linear equations can be set up as:

$$D \begin{bmatrix} m_1 \\ m_2 \\ m_3 \end{bmatrix} = 0 \quad (4)$$

Solving this system of equations is simple and can be done many ways, though one of the most common is to find the eigenvector of $D^T D$ corresponding to the smallest eigenvalue. This will be the vector that gets as close as possible, since D may not have a null space meaning there will be no exact solution. The camera matrix is only defined up to scale so all elements of the matrix can be divided by the last element to get a final M.

Figure 5:
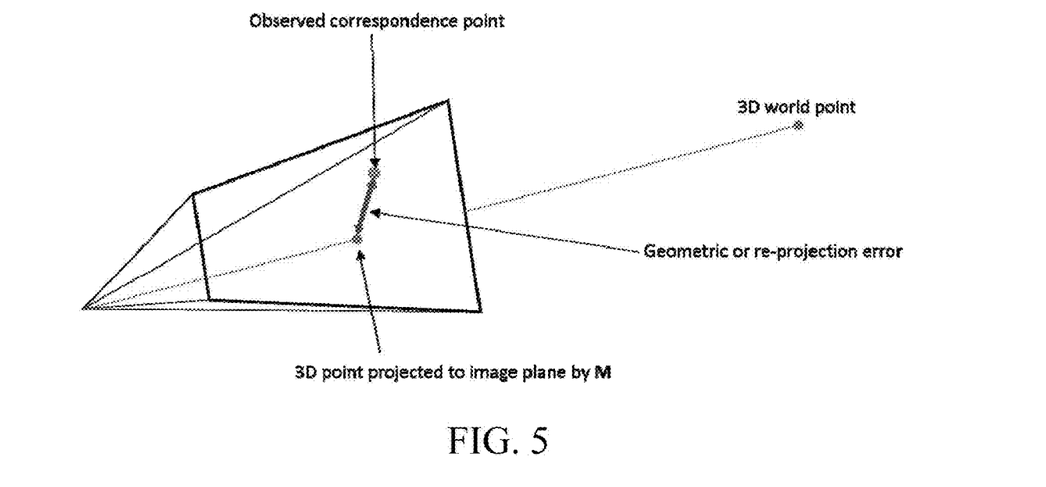
FIG. 5 is a diagram illustrating reprojection error between a 2D landmark and a projection of a corresponding 3D landmark onto an image plane.

This estimate of M has actually been found by minimizing the algebraic error between the correspondences. However, it is actually desired to minimize the geometric, or reprojection, error to get a better estimate of M. The reprojection error is the Euclidean distance between the actual 2D landmark and where M projects the corresponding 3D landmark in the image. FIG. 5 shows how these are related. In order to minimize the average reprojection error, which is a non-convex problem, any gradient descent method using the initial estimate of M can be used as a starting point. This results in a much better camera projection estimate.

II. C. Warping the 3D Shape

Once the camera matrix, M has been computed, the 3D model can be warped to fit the subject in the image rather than continue using a generic model. In order to do this, some set of new 3D landmark points believed to be more accurate to the true 3D shape of the subject need to be generated. These new 3D landmark points can then be used to warp the 3D model to fit the new shape. In order to determine these new points, some properties of M are exploited.

The first property of M to exploit is that the world coordinates of camera center can be determined directly from M. If M is decomposed into:

$$M = [A \, b] \quad (5)$$

wherein A is the first 3 columns of M and b is the last column of M, then the camera center, C can be expressed as:

$$C = A^{-1} b \quad (6)$$

Figure 6:
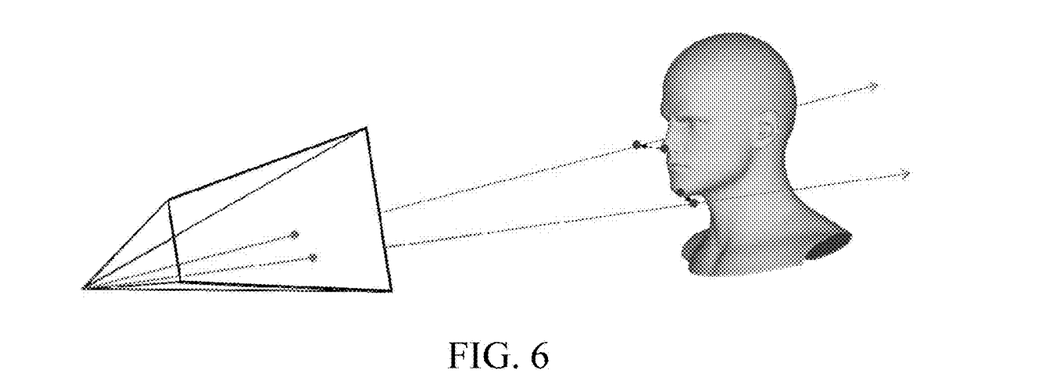
FIG. 6 is a diagram illustrating an example of two points, nose and chin, moving to the closest points on their corresponding rays tranced through the 2D landmarks.

Once the camera center has been determined, a ray can be traced from the camera center through any of the image points to find the set of all 3D points that would project to those image coordinates. Any possible 3D point for a given 2D landmark, $p'_{(w_i, \lambda)}$, can be expressed as:

$$p'_{(w_i, \lambda)} = \begin{bmatrix} C \\ 1 \end{bmatrix} + \lambda \begin{bmatrix} A^{-1} p_{c_i} \\ 0 \end{bmatrix} \quad (7)$$

wherein $\lambda$ is a scalar value indicating how far along the ray the point is. Once this parameterized form for the possible 3D landscape points is available, the $\lambda$ that minimizes the error between the 3D landmark on the generic model and the proposed 3D point can be determined. This will be the 3D points used for that correspondence allowing the shape of the model to be warped so that it projects properly onto the image and is specific to the person in the image. FIG. 6 shows how the 3D points move to the closest points on their corresponding rays.

The foregoing process only moves the landmark points on the 3D model. To move the rest of the 3D model, a warping function that can move all the points is needed. In general, any warping function could be used here to varying degrees of success. The present inventors have successfully used the Thin Plate Spline (TPS) warping function due to the fact that it allows the use of any number of control points, as long as there are at least 4 non-coplanar points, which have already been given in that 6 points are needed for the camera projection matrix estimate and it is a smooth interpolation of the points that will result in a smooth warped model. Since heads are smooth and not very jagged, this is a desirable trait.

A TPS warping function gives a parametric form for finding the least bent surface passing through a set of control points. The function is of the form $$f(x) = b + a^T x + \sum_{i=1}^{n} w_i U(|p_i - x|) \quad (8)$$

wherein x is a column vector with the x, y, and z coordinates of the input point, $p_i$ is the column vector containing the x, y, and z coordinates of the $i^{th}$ known control point, and U is a function of the form:

$$U(r) = r^2 \log(r) \quad (9)$$

There are 4 constraints for the 3D TPS function of the form:

$$\sum_{i=1}^{n} w_i = 0 \quad (10)$$

$$\sum_{i=1}^{n} w_i x_i = 0$$

$$\sum_{i=1}^{n} w_i y_i = 0$$

$$\sum_{i=1}^{n} w_i z_i = 0$$

b, a, and all the $w_i$s are the parameters of the function that need to be determined. The TPS function will only give the change in one coordinate based on an input point and therefore, 3 sets of parameters need to be computed. In order to compute a set of parameters, the 3D landmarks known in the generic model are used as the control points and the newly computed 3D landmarks are used as the positions that they should move to. It can easily be computed how much they should move in each coordinate, and the result can be used as the desired value of f(x). By reformulating all of these linear constraints in a matrix multiplication, the parameters of our TPS function can easily be solved for in a given coordinate.

The reformulation of the TPS equation requires creation of two new matrices. The first is:

$$K = \begin{bmatrix} U(r_{11}) & \cdots & U(r_{1n}) \\ \vdots & \ddots & \vdots \\ U(r_{n1}) & \cdots & U(r_{nn}) \end{bmatrix} \quad (11)$$

wherein $r_{ij} = |p_i - p_j|$. A matrix also needs to be created:

$$P = \begin{bmatrix} 1 & p_1^T \\ \vdots & \vdots \\ 1 & p_n^T \end{bmatrix} \quad (12)$$

Both of these can now be used to create a new block matrix of the form:

$$L = \begin{bmatrix} K & P \\ P^T & 0 \end{bmatrix} \quad (13)$$

The TPS function can now be rewritten for the change in the x coordinate for all control points as:

$$L \begin{bmatrix} w_1 \\ \vdots \\ w_n \\ b \\ a \end{bmatrix} = \begin{bmatrix} \Delta_{x_1} \\ \vdots \\ \Delta_{x_n} \\ 0 \end{bmatrix} \quad (14)$$

Wherein $\Delta_{x_i}$ is the desired change in the x coordinate for the $i^{th}$ control point. L will be invertible if the control points satisfy the constraints laid out earlier. This means the parameters can be found as:

$$\begin{bmatrix} w_1 \\ \vdots \\ w_n \\ b \\ a \end{bmatrix} = L^{-1} \begin{bmatrix} \Delta_{x_1} \\ \vdots \\ \Delta_{x_n} \\ 0 \end{bmatrix} \quad (15)$$

Figure 7:
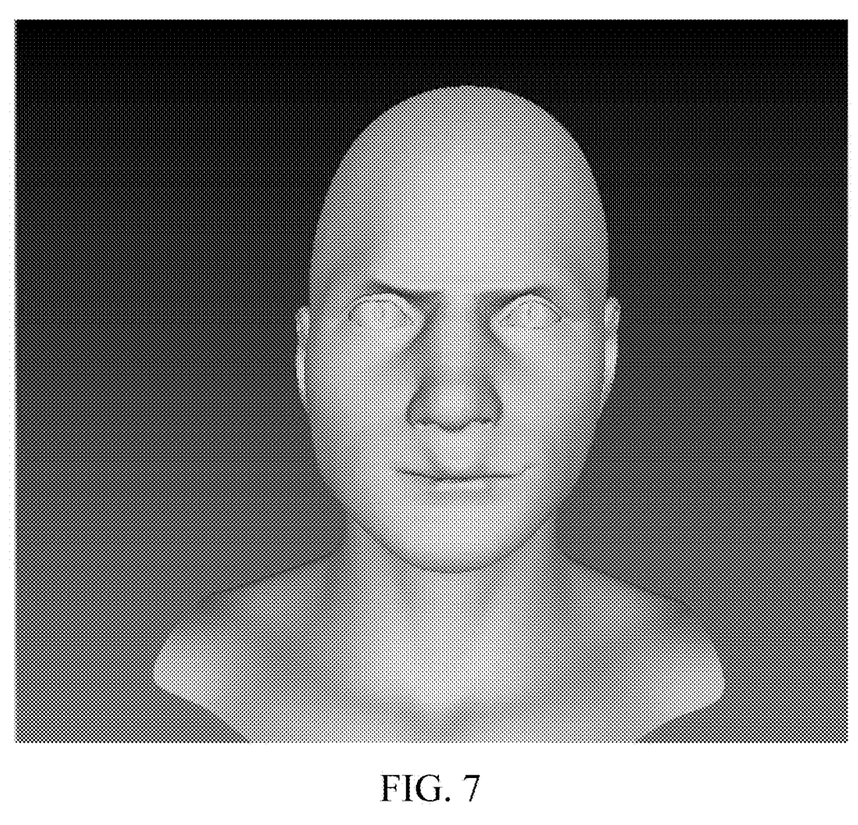
FIG. 7 is a diagram illustrating a derived 3D object model based on warping a generic 3D object model using the thin plate spline warping function and on new 3D landmarks found by back-projecting using a camera matrix.

The parameters can be found for each coordinate independently and all three functions can be applied to a given point to determine where that point would move on the warped surface. By applying this function on all vertices in the generic model, the result is a model that is specific to the subject in the image as can be seen in FIG. 7.

II. D. Regularizing the 3D shape

This new 3D shape generated is good in that it will project the landmarks exactly where it appears they should go in the image. However, points on the model farther away from the control points will be less accurate. Ideally, things like the top and back of the head could be landmarked, but these are points that are either not visible or very inaccurate to landmark automatically. In order to regularize the head model to be a more realistic shape, use is made of a data completion step to determine the positions of the desired new landmarks based on the ones known. Any suitable data completion technique can be used in this part of the method. For example, the WGHA and WK-SVD methods both allow for completion of the missing portions of data samples. In one case, the coordinates of the landmarks known are the known portions of the data samples, while the coordinates of the landmarks not known are the missing portions.

In both of these cases, the task is trying to learn a basis of some sort for the data from some set of ground truth data. This basis will allow for finding a set of projection coefficients that reconstruct the data that has been seen with small error and the reconstructing of the portions of the data that has not been seen. The data can be from any set of 3D scans as long as the set of landmarks have been annotated on them. Of course, many 3D scans do not have information at all parts of the head. Many older 3D scanners failed on hair especially. Therefore, the ground truth data used may not have all of the landmarks, either. This means the basis needs to be learned from incomplete data. In order to do this, the projection and reconstruction need to be formulated using the weights we know for which portions of the data are missing.

A basis can be derived by assuming a basis B with the basis vectors as the columns of this matrix. There is also a set of data vectors, $x_i$, along the columns of X and a corresponding weight matrix, W, in which each column, $w_i$, is a vector that specifies which dimensions of $x_i$ are known. The coefficients that create the best reconstructions of the known parts can be found by:

$$\hat{C} = \underset{C}{\operatorname{argmin}} \|W \odot (X - BC)\|_F^2 + \lambda_B \|B\|_F^2 + \lambda_C \|C\|_F^2 \qquad (16)$$

By taking the derivative of this equation with respect to each $c_i$, the $i^{th}$ column of C, and setting it equal to 0, it can be found that:

$$c_i = (B^T W_i^2 B + \lambda_c I)^{-1} B^T W_i^2 x_i \qquad (17)$$

wherein I is the identity matrix and $W_i$ is a diagonal matrix with $w_i$, the $i^{th}$ column of W on the diagonal. Using this, all of the coefficients for reconstruction can be found. However, the basis is not known, so how to create it needs to be derived.

Given coefficient matrix, C, along with W and X, it can be stated that the best basis for these coefficients can be found by:

$$\hat{B} = \underset{B}{\operatorname{argmin}} \|W \odot (X - BC)\|_F^2 + \lambda_B \|B\|_F^2 + \lambda_C \|C\|_F^2 \qquad (18)$$

Figure 8A:
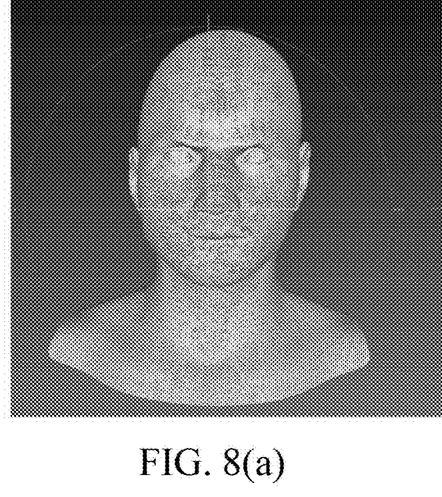
FIGS. 8(a) and (b) are diagrams illustrating a comparison of a warped model without regularization (FIG. 8(a)) and with regularized shape (FIG. 8(b))
Figure 8B:
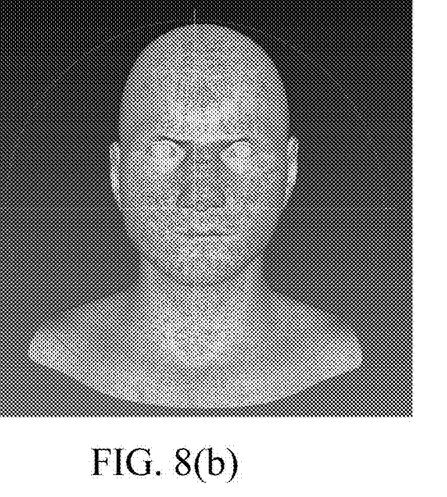

By taking the derivative of this equation with respect to $b^i$, the $i^{th}$ row of B and setting it equal to 0, the $i^{th}$ row of the basis should be:

$$b^i = x^i W^{i^2} C^T (C W^{i^2} C^T + \lambda_B I)^{-1} \qquad (19)$$

wherein $x^i$ is the $i^{th}$ row of X and $W^i$ is a diagonal matrix with $w^i$, the $i^{th}$ row of W, on the diagonal. Since neither B nor C is initially known, one can start with random matrices and iteratively apply these update rules until reaching some convergence criteria. The result is a basis B that can be used in conjunction with any new data, as long as it is known which parts are missing, to reconstruct the entire data sample. In this way, the locations of extra 3D landmarks can be constructed from the 3D landmarks generated in Section II.C. By having landmarked the generic model with these extra points, the TPS warping can use these extra points to generate a more realistic model as shown in FIGS. 8(a) and (b). Notice how the top of the head tilts without regularization (left) despite the fact that a person's head is extremely unlikely to look like that.

II. E. Texturing the Model

Figure 9A:
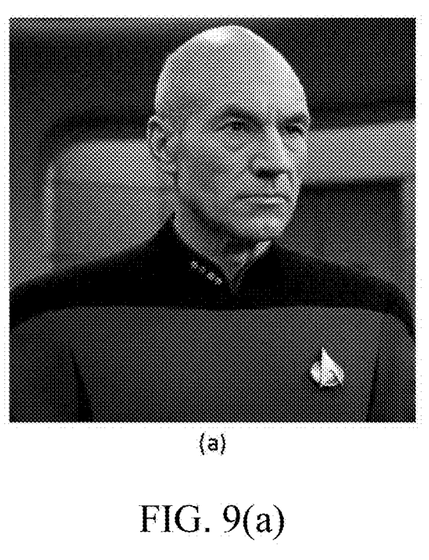
FIG. 9(a) illustrates an input 2D image and FIG. 9(b) illustrates a projection of 3D model vertices overlaid onto the input image, thereby giving (x, y) coordinates at which to sample for texture at each vertex.
Figure 9B:
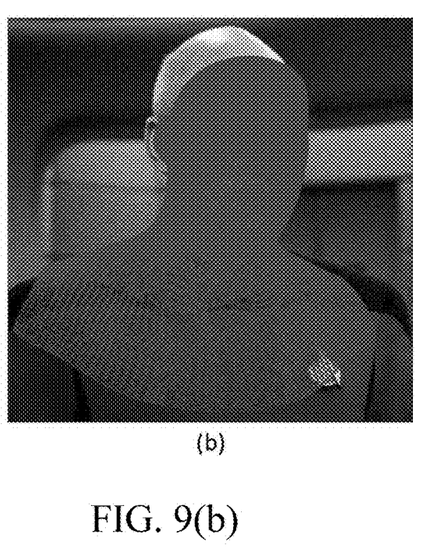
Figure 10:
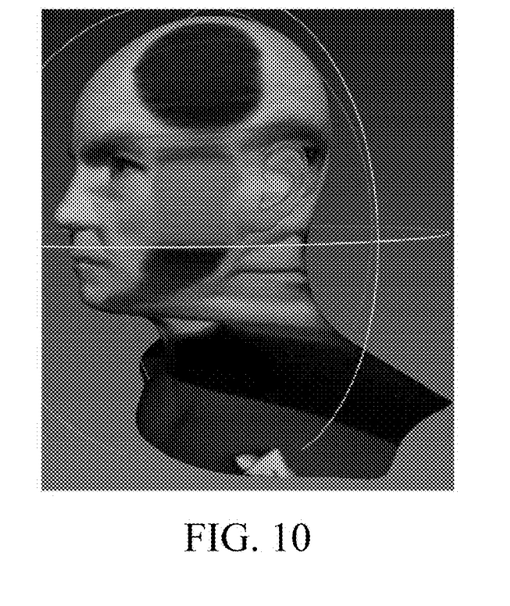
FIG. 10 illustrates a side view of a textured derived 3D craniofacial model of a head, wherein the face appears on the back of the head due to the loss of depth information when projecting to an input 2D image.

Once the 3D shape is obtained, the 3D model may be textured based on what is seen in the image. Since M, i.e., the camera projection matrix, has been calculated, the locations where each vertex on the model would project onto the image can be determined, as illustrated in FIGS. 9(a) and (b). This provides a point at which the texture value can be sampled for that vertex. However, since all depth information is lost when projecting to an image, points on non-visible sides of the model will then be textured with the values from the image. This can lead to very strange models with a face on the back or sides of the head as illustrated in FIG. 10.

Figure 11:
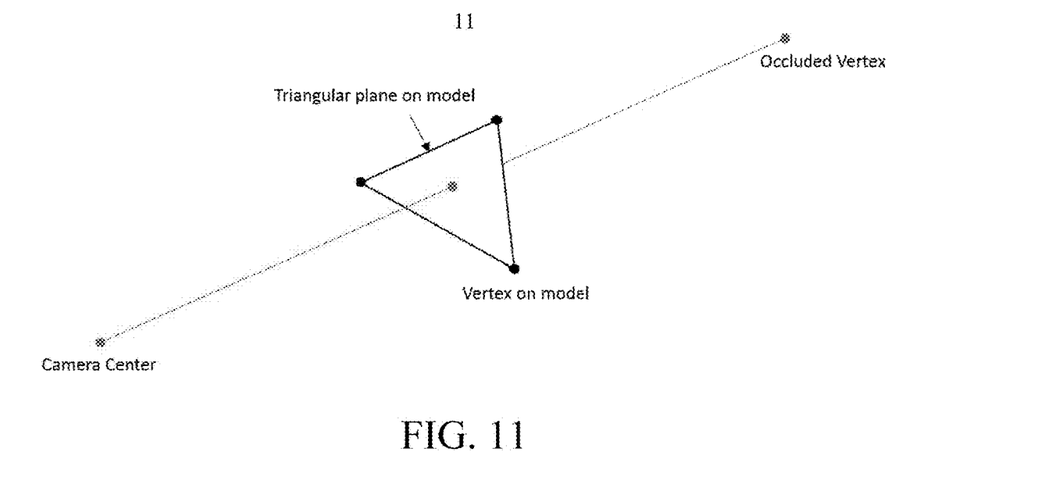
FIG. 11 is a diagram illustrating an example of a point being occluded from a camera's perspective by a triangle.

A priori knowledge of the shape of the 3D model and the fact that the camera location as shown in Section II-C is known can be used to determine which of the vertices are occluded by the model itself. This can be done by tracing a ray from the vertex to the camera center in the 3D space and checking if it intersects with any triangle on the 3D object, as illustrated in FIG. 11. Since the model has a triangulation built into it, as do all 3D meshes, this can easily be checked. To check if the ray and triangle intersect, the intersection point of the ray and the plane the triangle lies in can be computed and then the Barycentric coordinates of that point can be computed. These coordinates can reveal whether the point lies inside or outside the triangle, thereby making it possible to determine if the triangle occludes the visibility of the point or not.

Figure 12:
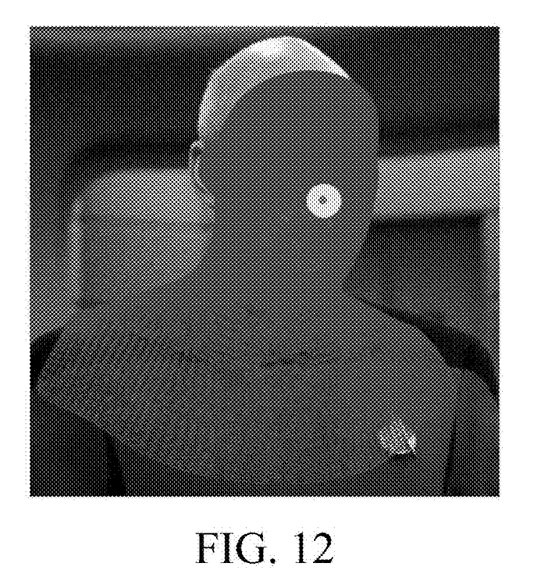
FIG. 12 illustrates an example of a 3D point's projected location (dot within the circle) and the projected location of all the verticies that might be part of occluding triangles (regions within the circle)
Figure 13:
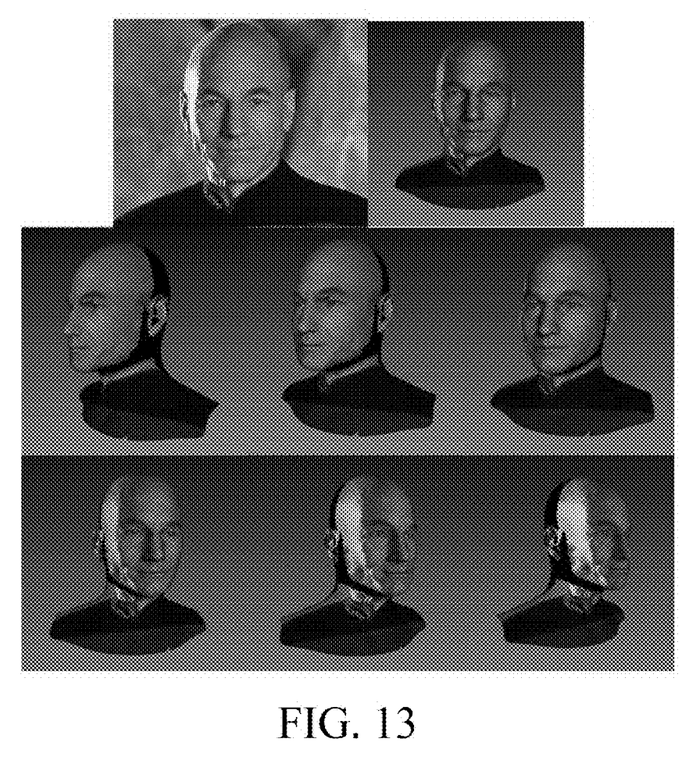
FIG. 13 illustrates a derived 3D craniofacial model reconstructed from an input 2D image (top left) as viewed from various viewpoints with occluded viewpoints textured in black.

Of course, the model can have an extremely large number of triangles in it, and checking each one would be infeasible. In reality, only triangles that have vertices in the region near where the point projects to need to be checked. Any other vertices are too far away to need to be checked. FIG. 12 shows the small region that contains all vertices that the triangles must be made up of to be checked. Any point that is occluded can be textured with any value we desire but is often textured with black so that it is obvious to the viewer that those are regions that are not visible, as illustrated in FIG. 13. This essentially is a basic ray tracing scheme to determine visible faces. It is a common technique in computer graphics and can be replaced easily with any other ray tracing technique without any change to the method. Those skilled in the art will readily understand that this is merely one possible way to perform texturing of the 3D model.

II. F Filling the Missing Regions

A convenient byproduct of Section II.E. is that it is known which vertices on the model are textured and which are not. This means the task of filling in the missing region can be put into a data completion framework again to reconstruct what the missing texture should be for each vertex that is not visible. This method can produce good results given enough training data. Since the dimensionality of the data can very be large (a set of texture values for each vertex in the model), it may not always be feasible to learn such a basis. However, since the 3D landmarks on the model are also known, some statistics about the skin of the face by pre-defining which vertices on the model are skin vertices can also be determined. These statistics can then be applied to any non-visible skin regions and the model filled in that way, blending at the edges if needed, to create a more visibly pleasing 3D reconstruction.

III. Example Computing System

It is to be noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 14 shows a diagrammatic representation of one embodiment of a computing device in the exemplary form of a computer system 1400 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine-readable media) including, but not limited to, a random access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating a derived 3D object model of an object from an input 2D image containing at least a portion of the object, the method comprising:
    receiving the input image and storing the input image in computer memory;
    receiving a plurality of 2D landmark points on the object within the input 2D image;
    executing an estimation algorithm to compute an estimated camera projection matrix for the input 2D image, wherein the estimation algorithm uses an existing 3D object model and is configured to minimize an average reprojection error;
    generating a set of derived 3D landmark points by:
        executing a camera center algorithm that computes a camera center from the estimated camera projection matrix; and
        executing a 3D landmark algorithm that computes, for each of the plurality of 2D landmark points, a corresponding derived 3D landmark point;
    warping the existing 3D object model using at least the derived 3D landmark points to generate the derived 3D object model; and
    storing the derived 3D object model in the computer memory.

2. The method according to claim 1, wherein the 3D landmark algorithm computes each of the derived 3D landmark points by finding a 3D point along a ray extending from the camera center through a corresponding one of the plurality of 2D landmark points that minimizes error between the 3D point and a corresponding 3D landmark point on the existing 3D object model.

3. The method according to claim 1, wherein:
    said receiving a plurality of 2D landmark points includes receiving at least six 2D facial landmark points, wherein at least four 2D facial landmark points of the at least six 2D facial landmark points are non-colinear; and
    said warping the existing 3D object model includes warping the existing 3D object model using a thin plate spline warping function to move points on the existing 3D object model other than the 3D landmark points corresponding to the derived 3D landmark points.

4. The method according to claim 1, further comprising regularizing the derived 3D object model by executing a regularization algorithm configured to perform data completion technique.

5. The method according to claim 1, wherein the existing 3D object model comprises a generic model of the object.

6. The method according to claim 1, wherein the object comprises a human head, the portion of the object comprises a human face, the derived 3D object model comprises a 3D craniofacial model, the plurality of 2D landmarks comprises a plurality of 2D facial landmarks, and the existing 3D object model comprises an existing 3D craniofacial model.

7. The method according to claim 6, wherein the 3D landmark algorithm computes each of the derived 3D landmark points by finding a 3D point along a ray extending from the camera center through a corresponding one of the plurality of 2D facial landmark points that minimizes error between the 3D point and a corresponding 3D landmark point on the existing 3D craniofacial model.

8. The method according to claim 6, wherein:
    said receiving a plurality of 2D landmark points includes receiving at least six 2D facial landmark points, wherein at least four 2D facial landmark points of the at least six 2D facial landmark points are non-colinear; and said warping the existing 3D craniofacial model includes warping the existing 3D craniofacial model using a thin plate spline warping function to move points on the existing 3D craniofacial model other than the 3D landmark points corresponding to the derived 3D landmark points.

9. The method according to claim 6, further comprising regularizing the derived 3D craniofacial model by executing a regularization algorithm configured to perform data completion technique.

10. The method according to claim 1, further comprising executing a camera projection matrix algorithm that minimizes an average reprojection error.

11. A machine-readable storage medium containing computer-executable instructions that, when executed on a computing system, performs a method of generating a derived 3D object model of an object from an input 2D image containing at least a portion of the object, the method comprising:
receiving the input image and storing the input image in computer memory;
receiving a plurality of 2D landmark points on the object within the input 2D image;
executing an estimation algorithm to compute an estimated camera projection matrix for the input 2D image, wherein the estimation algorithm uses an existing 3D object model and is configured to minimize an average reprojection error;
generating a set of derived 3D landmark points by:
executing a camera center algorithm that computes a camera center from the estimated camera projection matrix; and
executing a 3D landmark algorithm that computes, for each of the plurality of 2D landmark points, a corresponding derived 3D landmark point;
warping the existing 3D object model using at least the derived 3D landmark points to generate the derived 3D object model; and
storing the derived 3D object model in the computer memory.

12. The machine-readable storage medium according to claim 11, wherein the 3D landmark algorithm computes each of the derived 3D landmark points by finding a 3D point along a ray extending from the camera center through a corresponding one of the plurality of 2D landmark points that minimizes error between the 3D point and a corresponding 3D landmark point on the existing 3D object model.

13. The machine-readable storage medium according to claim 11, wherein:
said receiving a plurality of 2D landmark points includes receiving at least six 2D facial landmark points, wherein at least four 2D facial landmark points of the at least six 2D facial landmark points are non-colinear; and said warping the existing 3D object model includes warping the existing 3D object model using a thin plate spline warping function to move points on the existing 3D object model other than the 3D landmark points corresponding to the derived 3D landmark points.

14. The machine-readable storage medium according to claim 11, further comprising regularizing the derived 3D object model by executing a regularization algorithm configured to perform data completion technique.

15. The machine-readable storage medium according to claim 11, wherein the existing 3D object model comprises a generic model of the object.

16. The machine-readable storage medium according to claim 11, wherein the object comprises a human head, the portion of the object comprises a human face, the derived 3D object model comprises a 3D craniofacial model, the plurality of 2D landmarks comprises a plurality of 2D facial landmarks, and the existing 3D object model comprises an existing 3D craniofacial model.

17. The machine-readable storage medium according to claim 16, wherein the 3D landmark algorithm computes each of the derived 3D landmark points by finding a 3D point along a ray extending from the camera center through a corresponding one of the plurality of 2D facial landmark points that minimizes error between the 3D point and a corresponding 3D landmark point on the existing 3D craniofacial model.

18. The machine-readable storage medium according to claim 16, wherein:
said receiving a plurality of 2D landmark points includes receiving at least six 2D facial landmark points, wherein at least four 2D facial landmark points of the at least six 2D facial landmark points are non-colinear; and
said warping the existing 3D craniofacial model includes warping the existing 3D craniofacial model using a thin plate spline warping function to move points on the existing 3D craniofacial model other than the 3D landmark points corresponding to the derived 3D landmark points.

19. The machine-readable storage medium according to claim 16, further comprising regularizing the derived 3D craniofacial model by executing a regularization algorithm configured to perform data completion technique.

20. The machine-readable storage medium according to claim 11, further comprising executing a camera projection matrix algorithm that minimizes an average reprojection error.

* * * * *